US012591074B2

(12) United States Patent (10) Patent No.: US 12,591,074 B2
Takehara et al. (45) Date of Patent: Mar. 31, 2026

(54) X-RAY TRANSMISSION MEMBER

(71) Applicant: TORAY INDUSTRIES, INC., Tokyo (JP)

(72) Inventors: Tomohiro Takehara, Iyo-gun (JP);
Kentaro Adachi, Iyo-gun (JP);
Hidetoshi Sakai, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 175 days.

(21) Appl. No.: 18/685,398

(22) PCT Filed: Aug. 29, 2022

(86) PCT No.: PCT/JP2022/032353
§ 371 (c)(1),
(2) Date: Feb. 21, 2024

(87) PCT Pub. No.: WO2023/032893
PCT Pub. Date: Mar. 9, 2023

(65) Prior Publication Data
US 2024/0353582 A1 Oct. 24, 2024

(30) Foreign Application Priority Data
Sep. 1, 2021 (JP) ................................. 2021-142144

(51) Int. Cl.
*G01T 7/00* (2006.01)
*G03B 42/02* (2021.01)

(52) U.S. Cl.
CPC ................ *G01T 7/00* (2013.01); *G03B 42/02* (2013.01)

(58) Field of Classification Search
CPC .. G01T 7/00; G03B 42/02; A61B 6/44; A61B 6/00; A61B 6/04; A61B 6/03; B32B 5/24
See application file for complete search history.

(56) References Cited

U.S. PATENT DOCUMENTS

2016/0214346 A1 7/2016 Hatanaka et al.
2018/0110484 A1 4/2018 Kobayashi et al.
(Continued)

FOREIGN PATENT DOCUMENTS

EP 3 769 685 A1 1/2021
JP 2006-35671 A 2/2006
(Continued)

OTHER PUBLICATIONS

International Search Report, issued in PCT/JP2022/032353, PCT/ISA/210, dated Nov. 8, 2022.
(Continued)

*Primary Examiner* — Kiho Kim
(74) *Attorney, Agent, or Firm* — Birch, Stewart, Kolasch & Birch, LLP

(57) ABSTRACT

An object of the present invention is to provide a member that improves image quality of an X-ray image obtained when the member is applied as an X-ray transmission member of an X-ray inspection equipment. One aspect of the X-ray transmission member of the present invention for achieving the above object is an X-ray transmission member used in the X-ray inspection equipment, and the X-ray transmission member includes a core material (I) and a surface material (II) disposed on at least one side of the core material (I), in which the core material (I) is a porous body, the surface material (II) includes a fiber-reinforced resin, and an arithmetic mean roughness Ra defined by JIS B0601 (2001) of a cross-sectional curve formed by a joining surface on the surface material (II) side of the core material (I) is 50 μm or less.

18 Claims, 3 Drawing Sheets

(56) References Cited

U.S. PATENT DOCUMENTS

| 2018/0140750 | A1  | 5/2018 | Shibata et al. | |
| 2021/0106293 | A1  | 4/2021 | Takehara et al. | |
| 2021/0244118 | A1* | 8/2021 | Fujioka | B32B 5/26 |

FOREIGN PATENT DOCUMENTS

| JP | 2018-64833 A | 4/2018 |
| JP | 6314984 B2 | 4/2018 |
| WO | WO 2015/029634 A1 | 3/2015 |
| WO | WO 2017/013911 A1 | 1/2017 |
| WO | WO 2019/182076 A1 | 9/2019 |

OTHER PUBLICATIONS

Written Opinion of the International Searching Authority, issued in PCT/JP2022/032353, PCT/ISA/237, dated Nov. 8, 2022.
Extended European Search Report for European Application No. 22864476.1, dated Jul. 25, 2025.

* cited by examiner

X-RAY TRANSMISSION MEMBER

TECHNICAL FIELD

The present invention relates to an X-ray transmission member used in an X-ray inspection equipment, and an X-ray inspection equipment.

BACKGROUND ART

A member having good radiolucency and high stiffness is required for an imaging table and a housing of an inspection device by radiation. Here, as the radiation, an X-ray is particularly known. As an inspection equipment by the X-ray, for example, an X-ray imaging equipment such as X-ray, mammography, an X-ray cassette, a CT apparatus, and an IVR apparatus is known. Conventionally, as such a member, a fiber-reinforced resin or a sandwich-like laminated body in which the fiber-reinforced resin is used as a surface material and bonded to a resin foam as a core material has been applied.

For example, a bed for radiation imaging described in Patent Document 1 has a configuration in which a resin foam is covered with a prepreg including carbon fibers and a radically polymerizable matrix resin, and the matrix resin is cured. With such a configuration, a top board portion having excellent radiolucency, stiffness, strength, water resistance, and moisture resistance can be formed.

A top board for an X-ray diagnostic apparatus described in Patent Document 2 has a sandwich structure in which a decorative board is bonded to a surface of a porous body, including discontinuous carbon fibers and a thermosetting resin, as a core material, and stiffness of the core material is increased to increase stiffness of the whole top board.

Patent Document 3 relates to an X-ray cassette in which a housing having a sandwich structure in which a foam layer is embedded in a material containing carbon fibers is applied, and discloses a technique for achieving both lightweight and impact strength by making a layer thickness on an outer surface side thicker than the layer thickness on an inner surface side. A radiolucency rate is improved by reducing the weight of the housing.

PRIOR ART DOCUMENTS

Patent Documents

Patent Document 1: Japanese Patent Laid-open Publication No. S57-3625
Patent Document 2: Japanese Patent Laid-open Publication No. H8-280667
Patent Document 3: International Publication No. 2014/080692

SUMMARY OF THE INVENTION

Problems to be Solved by the Invention

On the other hand, for early detection of a lesion, it is important to improve image quality of an image captured by an X-ray inspection equipment; however, in general, it is said that the image quality and reduction of an exposure dose are in a trade-off relationship. Thus, there has been a demand for a technique for improving the image quality without increasing the exposure dose.

The present invention has been made in view of the above problems, and an object of the present invention is to provide a member that improves image quality of an X-ray image obtained when the member is applied as an X-ray transmission member of an X-ray inspection equipment.

Solutions to the Problems

In order to solve the above problem, a first aspect of the X-ray transmission member of the present invention is an X-ray transmission member used in an X-ray inspection equipment, the X-ray transmission member includes a porous body, and a surface of the porous body has an arithmetic mean roughness Ra defined in JIS B0601 (2001) of 100 μm or less.

A second aspect of the X-ray transmission member of the present invention is an X-ray transmission member used in an X-ray inspection equipment, and the X-ray transmission member includes a core material (I) and a surface material (II) disposed on at least one side of the core material (I), in which the core material (I) is a porous body, the surface material (II) includes a fiber-reinforced resin, and an arithmetic mean roughness Ra defined by JIS B0601 (2001) of a cross-sectional curve formed by a joining surface on the surface material (II) side of the core material (I) is 50 μm or less.

Effects of the Invention

By using the X-ray transmission member of the present invention as a structural member including an X-ray transmission portion in the X-ray inspection equipment, image quality of the X-ray image can be improved. Alternatively, an exposure dose required to obtain an X-ray image of equivalent image quality can be reduced.

EMBODIMENTS OF THE INVENTION

Figure 1:
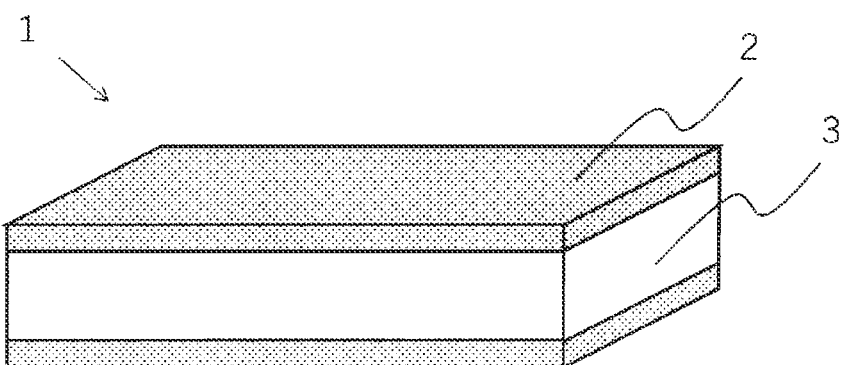
FIG. 1 is a schematic view illustrating one embodiment of a configuration of an X-ray transmission member of the present invention.

A first aspect of the X-ray transmission member of the present invention is an X-ray transmission member used in an X-ray inspection equipment, the X-ray transmission member includes a porous body, and a surface of the porous body has an arithmetic mean roughness Ra defined in JIS B0601 (2001) of 100 μm or less. The arithmetic mean roughness Ra is preferably 50 μm or less, and more preferably 20 μm or less. By setting the arithmetic mean roughness Ra of the surface of the porous body within such a range, it is possible to suppress deterioration of noise characteristics (noise power spectrum) of an X-ray image due to adhesion of foreign substances on the surface of the porous body, and to suppress deterioration of image quality of the obtained X-ray image. Examples of the factors that deteriorates the noise characteristics include paint accumulation in the case of painting the porous body surface, and dust accumulation in the case of using the porous body surface exposed. Here, the arithmetic mean roughness of the porous body surface is measured by a contact-type surface roughness measuring device in which a tip of a contact needle directly touches the surface. When a measurement sample is very brittle, for example, and it is difficult to measure the arithmetic mean roughness with the contact-type surface roughness measuring device, the arithmetic mean roughness may be measured with a non-contact-type surface roughness measuring device using a laser microscope or the like.

According to the first aspect of the X-ray transmission member of the present invention, it is preferable to include a core material (I) and a surface material (II) including a fiber-reinforced resin on at least one side of the core material (I), and the core material (I) is preferably the porous body. Since the core material (I) can be thinned due to a reinforcing effect obtained by including the surface material (II), an X-ray permeability is easily improved. Since the arithmetic mean roughness Ra of the porous body surface is in the above range, inflow of an adhesive component such as a resin in the fiber-reinforced resin or an adhesive at the time of integration with the surface material (II) is suppressed, and a boundary between the core material (I) and the surface material (II) can be smoothed, so that the noise characteristics of the X-ray image are further improved, and the image quality of the X-ray image is further improved.

A second aspect of the X-ray transmission member of the present invention is an X-ray transmission member used in an X-ray inspection equipment, and the X-ray transmission member includes a core material (I) and a surface material (II) disposed on at least one side of the core material (I), in which the core material (I) is a porous body, the surface material (II) includes a fiber-reinforced resin, and an arithmetic mean roughness Ra defined by JIS B0601 (2001) of a cross-sectional curve formed by a joining surface on the surface material (II) side of the core material (I) is 50 μm or less.

In the X-ray transmission member of the present invention, the X-ray inspection equipment is not limited as long as it is a device that inspects the inside of the structure using X-rays, and specific examples thereof include a medical device that acquires an X-ray image of a human body and an industrial X-ray inspection equipment used for non-destructive inspection of an object. The X-ray transmission member in the present specification is a structural member constituting a region through which the X-ray is transmitted in such an X-ray inspection equipment. Specific examples of the X-ray transmission member include a member constituting a housing that protects an X-ray tube, a housing that protects a detector that detects the X-ray and converts the X-ray into an image, an imaging table that supports a subject in the case of a medical device, and an imaging table that supports an object in the case of an industrial X-ray inspection equipment.

In the X-ray transmission member of the present invention, the X-ray inspection equipment is preferably a medical device that acquires the X-ray image of the human body. Examples of the medical device mainly include a mammography apparatus, an X-ray cassette, a CT top board, and IVR equipment.

In the second aspect of the X-ray transmission member of the present invention, in the configuration including the core material (I) that is a porous body and the surface material (II) including the fiber-reinforced resin and disposed on at least one side of the core material (I), the arithmetic mean roughness Ra defined in JIS B0601 (2001) of the cross-sectional curve formed by the joining surface on the surface material (II) side of the core material (I) is 50 μm or less. As described above, a boundary between the core material (I)

and a layer (hereinafter, may be referred to as an adjacent layer) adjacent to the core material (I) is smoothed to suppress inflow of the resin of the surface material (II) and the adhesive into the surface of the core material (I) and generation of a resin pool. When a foreign substance such as paint, dust, or resin is accumulated in a recess on the porous body surface, the X-ray permeability is different between a portion where the foreign substance is accumulated and a portion where the foreign substance is not accumulated, so that the noise characteristics of the X-ray image are deteriorated. In the second aspect of the X-ray transmission member of the present invention, the noise characteristics of the X-ray image are improved and the image quality of the X-ray image is improved by suppressing the arithmetic mean roughness of the porous body surface on which the foreign substance is accumulated. Thus, the accuracy of the X-ray inspection, that is, the diagnosis accuracy of specifying a lesion in the case of the medical device, and the inspection accuracy of specifying an internal structure in the case of the non-destructive inspection of the object are improved. Here, examples of the method of setting the arithmetic mean roughness Ra of the cross-sectional curve within the above range include a method of controlling a molding pressure at the time of integration with the surface material (II), a method of using a porous body whose surface is previously subjected to a heating and/or pressurizing treatment with a heating platen, and a method of including a buffer layer (III) described later. From the viewpoint of improving the image quality of the resulting X-ray image, in the second aspect of the X-ray transmission member of the present invention, the arithmetic mean roughness Ra of the cross-sectional curve is more preferably 20 μm or less. On the other hand, the lower limit of the arithmetic mean roughness Ra of the cross-sectional curve is not particularly limited; however, the arithmetic mean roughness Ra of the cross-sectional curve is preferably 3 μm or more because a physical anchoring effect contributing to joint strength between the core material (I) and the adjacent layer such as the surface material (II) tends to be large. When the X-ray transmission member is a sandwich structure to be described later, the arithmetic mean roughness Ra of the cross-sectional curve at boundaries with the adjacent layers on both sides of the core material (I) is preferably in the predetermined range.

Figure 3:
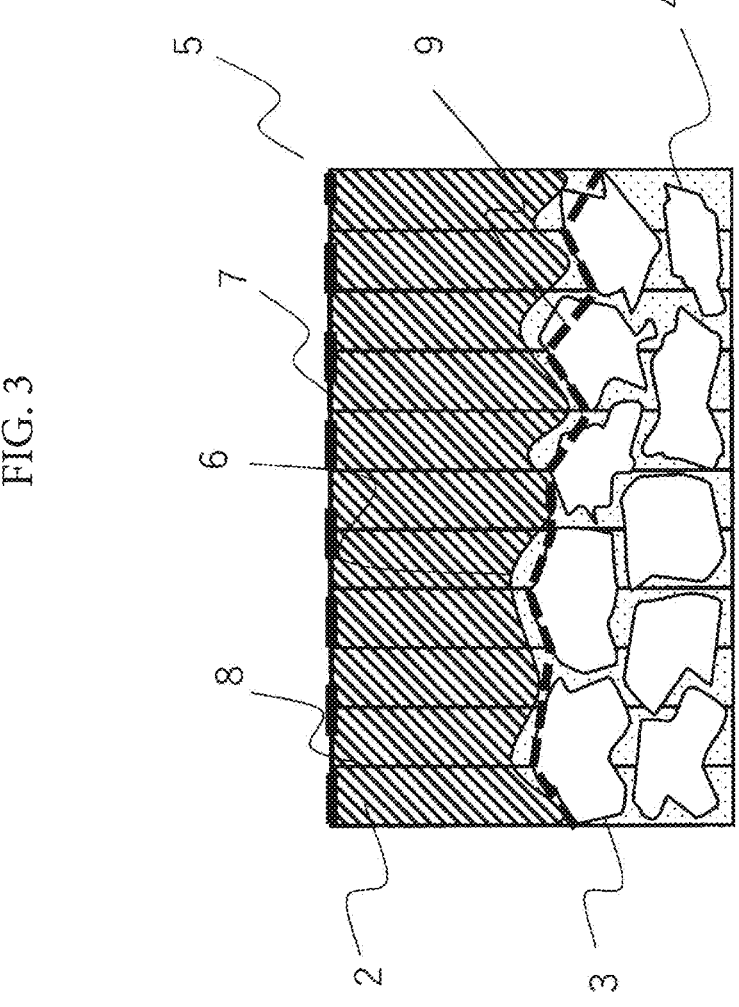
FIG. 3 is a schematic view for explaining how to obtain a cross-sectional curve formed by a joining surface on a surface material (II) side of a core material (I) in the X-ray transmission member of the present invention.

Here, the cross-sectional curve is a curve approximating a boundary between a porous structure of the core material (I) and its adjacent layer such as the surface material (II) in a cross section cut perpendicularly from the surface of the X-ray transmission member. In order to define the cross-sectional curve, first, a cross-sectional image of the X-ray transmission member is acquired by X-ray CT, an optical microscope, a scanning electron microscope (SEM), a transmission electron microscope (TEM), or the like. FIG. 3 illustrates an example of a schematic view of a cross-sectional image of the X-ray transmission member. In a cross-sectional image 5 illustrated in FIG. 3, a surface material (II) 2 is disposed on one side of a core material (I) 3, and the surface material (II) 2 and the core material (I) 3 are in close contact with each other while forming a boundary 6. Vertical lines 8 are drawn at an interval of 5 μm from the surface material (II) 2 toward the core material (I) 3 with an outer surface 7 of the surface material (II) 2 of the cross-sectional image 5 as a reference line. A point at which a vertical line 8 drawn from the reference line intersects a void 4 constituting the porous structure of the core material (I) for the first time is plotted, and a line connecting the plotted points is defined as a cross-sectional curve 9.

The X-ray transmission member of the present invention has a structure including the core material (I) and the surface material (II) including the fiber-reinforced resin disposed on at least one side of the core material (I), and examples of such a structure include a canape structure in which the surface material (II) is disposed on one side of the core material (I) and a sandwich structure in which the surface materials (II) are arranged on both sides of the core material (I). FIG. 1 illustrates an example of a sandwich structure. In FIG. 1, in the X-ray transmission member 1, the surface materials (II) 2 are arranged on both surfaces of the core material (I) 3. Disposing the surface material (II) including the fiber-reinforced resin at least on the side located on an outer surface of the X-ray inspection equipment is preferable because breakage such as scratches and dents of the X-ray transmission member can be suppressed when a load or impact is applied from the outside. The canape structure is preferable from the viewpoint of increasing a radiolucency rate by reducing the weight of the material that transmits the X-ray, and the sandwich structure is preferable from the viewpoint of protecting the X-ray transmission member from a load or impact applied from the outside and suppressing a failure of a built-in component of the X-ray device due to interference between the transmission member and the built-in component. In the X-ray transmission member of the present invention, the structure of the surface material (II) is not particularly limited as long as the surface material (II) is disposed so as to cover at least a part of at least one side of the core material (I), and may be a structure in which the surface material (II) is wound around the core material (I) or a structure in which the core material (I) is sealed with the surface material (II). As described later, a buffer layer may be provided between the core material (I) and the surface material (II).

In the X-ray transmission member of the present invention, a ratio ts/tc of a sum ts of the thicknesses of the surface material (II) and a sum tc of the thicknesses of the core material (I) is preferably 0.10 or more and 0.55 or less. By setting the ratio ts/tc within the above range, a balance between the mechanical properties and the X-ray permeability of the X-ray transmission member is easily excellent.

The surface material (II) in the X-ray transmission member of the present invention is a molded body containing the fiber-reinforced resin, that is, a reinforcing fiber and a matrix resin.

The type of reinforcing fibers included in the fiber-reinforced resin is not particularly limited, and for example, inorganic fibers such as carbon fibers and glass fibers, organic fibers such as aramid fibers, or natural fibers can be used. One or two or more of these may be used in combination. In particular, the X-ray transmission member of the present invention preferably includes carbon fibers as the reinforcing fibers of the surface material (II). Since the carbon fiber has high specific strength and specific rigidity, the radiolucency rate can be further improved. Examples of the carbon fibers include polyacrylonitrile (PAN)-based carbon fibers and pitch-based carbon fibers. On the other hand, from the viewpoint of economic efficiency, it is preferable to include glass fibers as the reinforcing fibers. From the viewpoint of a balance between strength and economic efficiency, it is also preferable to include carbon fibers and glass fibers as the reinforcing fibers.

The form of the reinforcing fibers included in the fiber-reinforced resin is not particularly limited, and examples thereof include a woven fabric form in which a woven structure is formed and a form in which the fibers are unidirectionally aligned as long as the reinforcing fibers are continuous. Examples of discontinuous reinforcing fibers include a form in which the fibers are unidirectionally aligned and a form in which the fibers are dispersed. These fibers may be used singly or stacked, or may be stacked in combination of two or more kinds thereof. The term "continuous reinforcing fibers" means fibers that are not cut into short fibers but are obtained by aligning fiber bundles in a continuous state. Here, the short fibers refer to fibers having a length of 100 mm or less. In particular, it is preferable that the surface material (II) includes continuous reinforcing fibers from the viewpoint of making an in-plane distribution of the radiolucency rate uniform, that is, reducing an in-plane density difference, and it is more preferable that the surface material (II) includes continuous reinforcing fibers aligned unidirectionally from the viewpoint of being easily arranged without a gap. In particular, when the continuous reinforcing fibers aligned unidirectionally are included, it is preferable to adopt a form in which the fibers are stacked with a fiber orientation direction shifted by a predetermined angle. By adopting such a form, mechanical properties in a plurality of directions can be enhanced.

The matrix resin included in the fiber-reinforced resin is not particularly limited, and any of a thermosetting resin and a thermoplastic resin can be used. When the matrix resin is a thermosetting resin, the thermosetting resin is cured by heating during molding and further heating to a temperature at which the thermosetting resin is cured after molding as necessary, thereby forming a matrix resin. When the resin is a thermoplastic resin, the resin melted by heating during molding is cooled and solidified to form a matrix resin. As a molding base material for forming the fiber-reinforced resin, it is preferable to use a prepreg formed by impregnating reinforcing fibers with a resin.

The thermosetting resin may be any thermosetting resin as long as it causes a crosslinking reaction by heat to form an at least partial three-dimensional crosslinked structure, and examples thereof include epoxy resins, vinyl ester resins, phenol resins, and unsaturated polyester resins.

Examples of the thermoplastic resin include polypropylene resins, polyethylene resins, polyamide resins, polyester resins, polyarylene sulfide resins, polyether ketone resins, polyether ether ketone resins, polyether ketone ketone resins, polyether sulfone resins, polyimide resins, polyamide-imide resins, polyether imide resins, and polysulfone resins, and cyclic oligomers which are precursors of any of these resins are also preferably used.

In addition, a plurality of the resins described above may be mixed and used, or an additive such as a hardener or a curing accelerator or a filler may be added. From the viewpoint of chemical resistance, the matrix resin of the fiber-reinforced resin of the surface material (II) is preferably a thermosetting resin.

The core material (I) in the X-ray transmission member of the present invention is a porous body. The porous body preferably includes at least a resin and voids. By using the porous body, while the weight is reduced, the amount of objects through which the X-ray passes is reduced, so that the X-ray permeability is improved.

In the X-ray transmission member of the present invention, the porous body preferably has a density of 0.05 g/cm$^3$ or more and 0.50 g/cm$^3$ or less. When the density of the porous body is 0.05 g/cm$^3$ or more, although the effect of improving the X-ray permeability is slightly diminished, the porous body is hardly crushed even under a high load, and the subject is easily held when the porous body is formed into the X-ray transmission member. When the density of the porous body is 0.50 g/cm$^3$ or less, the effect of improving the X-ray permeability becomes remarkable, and the balance between the mechanical properties and the X-ray permeability as the X-ray transmission member is easily improved as compared with a configuration in which a filled body having better mechanical properties than the porous body is applied. As a method for setting the density of the porous body within the above range, when the porous body includes discontinuous reinforcing fibers to be described later, for example, a method of controlling the thickness in the process of expansion-cooling in producing the porous body can be mentioned.

In the X-ray transmission member of the present invention, the porous body preferably has a bending modulus defined by JIS K7017 (1999) of 2.0 GPa or more and 7.5 GPa or less. By setting the bending modulus of the porous body within such a range, deformation can be suppressed in a load range acting on the X-ray transmission member, and an X-ray image free from unevenness can be obtained. By setting the bending modulus of the porous body within such a range, the thickness of the surface material (II) can be reduced when the porous body is integrated with the surface material (II), so that the effect of improving the radiolucency rate can be enhanced. Examples of the method for setting the bending modulus of the porous body within the above range include a method of adjusting the density of the porous body. When the porous body includes discontinuous reinforcing fibers to be described later, for example, a method of increasing the bending modulus of the porous body by increasing the content of the reinforcing fibers can be mentioned.

In the X-ray transmission member of the present invention, the porous body preferably has a bending strength of 15 MPa or more and 150 MPa or less. By setting the bending strength of the porous body within such a range, breakage in the load range acting on the X-ray transmission member can be suppressed, and an X-ray image excellent in noise characteristics can be obtained. When the porous body is integrated with the surface material (II), cracking of the surface material (II) due to breakage of the porous body can be suppressed, so that safety for protecting the subject is improved. In addition, since the thickness of the surface material (II) can be reduced, the effect of improving the radiolucency rate can be enhanced. Here, the bending strength is defined with reference to JIS K7017 (1999) similarly to the bending modulus described above. Examples of the method for setting the bending strength of the porous body within the above range include the method of adjusting the density of the porous body. When the porous body includes the discontinuous reinforcing fibers to be described later, for example, a method of adjusting a fiber length of the reinforcing fibers can be mentioned.

In the X-ray transmission member of the present invention, it is particularly preferable that the porous body simultaneously satisfies the range of the bending modulus and the range of the bending strength from the viewpoint of the mechanical properties and X-ray permeability as the X-ray transmission member.

The material included in the porous body is not particularly limited, and preferably contains a resin. As the resin, both a thermosetting resin and a thermoplastic resin may be used. Examples of the thermosetting resin include epoxy resins, vinyl ester resins, phenol resins, thermosetting polyimide resins, polyurethane resins, melamine resins, and acrylic resins. Examples of the thermoplastic resin include polypropylene resins, polyethylene resins, polycarbonate resins, polyamide resins, polyester resins, polyarylene sulfide resins, polyphenylene sulfide resins, polyether ketone resins, polyether ether ketone resins, polyether ketone ketone resins, polyether sulfone resins, polyimide resins, polyamide imide resins, polyether imide resins, polysulfone resins, polystyrene resins, acrylonitrile-butadiene-styrene (ABS) resins, polyvinyl chloride resins, and polymethacrylimide resins. In addition, cyclic oligomers which are precursors of any of these resins are also preferably used. One or two or more of these resins may be used in combination. The resin may include an additive or a filler.

In the X-ray transmission member of the present invention, the porous body preferably includes discontinuous reinforcing fibers, and particularly preferably has a structure in which the discontinuous reinforcing fibers are randomly dispersed in an in-plane direction in the porous body. When the porous body includes discontinuous reinforcing fibers, mechanical properties are significantly improved. In particular, in the case of the structure in which the discontinuous reinforcing fibers are randomly dispersed in the in-plane direction, since mechanical isotropy is exhibited, a property change due to an arrangement error assumed at the time of molding does not substantially occur, and reliability of the X-ray device is further improved. Here, the in-plane direction means a direction orthogonal to the thickness direction in the X-ray transmission member. The randomly dispersed state can be defined by a fiber two-dimensional orientation angle of the discontinuous reinforcing fibers. An average value of the two-dimensional orientation angles is preferably in a range of 30 degrees or more and 60 degrees or less. Here, as a method of deriving the average value of the fiber two-dimensional orientation angles, the following method can be exemplified. For reinforcing fiber monofilaments randomly selected in a plane orthogonal to the thickness direction in the X-ray transmission member, an angle formed with all crossing reinforcing fiber monofilaments, that is, an average value of two-dimensional orientation angles is measured. Crossing does not mean that the fibers need to be in contact with each other, and the fibers may be seen as crossing each other in a cross section of the porous body. As the two-dimensional orientation angle, an acute angle of two obtained angles is adopted. When there are a large number of reinforcing fiber monofilaments crossing the reinforcing fiber monofilaments, 20 crossing reinforcing fiber monofilaments are selected. This measurement is repeated 5 times in total focusing on another reinforcing fiber monofilament, and the average value of 100 two-dimensional orientation angles is calculated as the average value of the two-dimensional orientation angles.

In the X-ray transmission member of the present invention, an average fiber length of the discontinuous reinforcing fibers included in the porous body is preferably 1.5 mm or more and 15 mm or less. Within this range, uniformity of arrangement of the discontinuous reinforcing fibers in the porous body and reinforcing efficiency of the porous body are well balanced, so that the image quality of the obtained X-ray image is further improved. Here, the average fiber length of the discontinuous reinforcing fibers is an arithmetic average of fiber lengths. As a measurement method thereof, the discontinuous reinforcing fibers are separated from the X-ray transmission member, 400 separated discontinuous reinforcing fibers are randomly extracted, measurement is performed from an observation image obtained with an optical microscope or a scanning electron microscope, and the average value is calculated. Examples of the method of separating the discontinuous reinforcing fibers from the X-ray transmission member include a method in which the X-ray transmission member is sufficiently dissolved in a solvent for dissolving the resin of the X-ray transmission member and then the discontinuous reinforcing fibers are extracted by a known operation such as filtration, and a method in which the resin is burn out by a burnout method to extract the discontinuous reinforcing fibers.

In the X-ray transmission member of the present invention, a ratio Lf/d of an average fiber length Lf and an average fiber diameter d of the discontinuous reinforcing fibers is more preferably 100 or more and 2500 or less. By setting the ratio Lf/d within such a range, it is possible to suppress unevenness of crossing between fibers generated by bending of the discontinuous reinforcing fibers and to suppress local fluctuation of the radiolucency rate, so that the noise characteristics of the obtained X-ray image are easily improved. Here, as a method of measuring the average fiber length Lf and the average fiber diameter d of the discontinuous reinforcing fibers, the discontinuous reinforcing fibers are separated from the X-ray transmission member, 400 separated discontinuous reinforcing fibers are randomly extracted, measurement is performed from an observation image obtained with an optical microscope or a scanning electron microscope, and the average value is calculated. Examples of the method of separating the discontinuous reinforcing fibers from the X-ray transmission member include a method in which the X-ray transmission member is sufficiently dissolved in a solvent for dissolving the resin of the X-ray transmission member and then the discontinuous reinforcing fibers are extracted by a known operation such as filtration, and a method in which the resin is burn out by a burnout method to extract the discontinuous reinforcing fibers.

The type of the discontinuous reinforcing fibers included in the porous body is not particularly limited, and for example, inorganic fibers such as carbon fibers and glass fibers, organic fibers such as aramid fibers, or natural fibers can be used. One or two or more of these may be used in combination. In particular, the X-ray transmission member of the present invention preferably includes carbon fibers as the reinforcing fibers of the porous body of the core material (I). Since the carbon fiber has high specific strength and specific rigidity, the radiolucency rate can be further improved. Examples of the carbon fibers include PAN-based carbon fibers and pitch-based carbon fibers.

In addition, in order to obtain a homogeneous image as the X-ray image, it is more preferable that such discontinuous reinforcing fibers are dispersed in a substantially monofilament state. Here, the phrase "substantially monofilament state" refers to existing in fine-denier strands having less than 500 discontinuous reinforcing fiber monofilaments. A monofilament diameter of the discontinuous reinforcing fiber is preferably 20 $\mu$m or less, more preferably 10 $\mu$m or less from the viewpoint of homogeneity of the X-ray image. When the monofilament diameter is larger than 20 $\mu$m, the homogeneity of the X-ray image may be deteriorated.

In the X-ray transmission member of the present invention, it is particularly preferable that the porous body has a three-dimensional network structure in which a resin is attached to a crossing portion of the discontinuous reinforcing fibers. In such a structure, voids included in the porous body are regions where the discontinuous reinforcing fibers and the resin are not present in the three-dimensional network structure formed by the discontinuous reinforcing fibers and the resin. With such a structure, an effect of improving mechanical properties such as elastic modulus and strength can be exhibited as compared with a case where a porous body is formed of a resin alone, so that both the core material (I) and the surface material (II) can be thinned, and the X-ray permeability is improved. As the X-ray transmission member used in the X-ray device, the effect of suppressing destruction due to external load and impact is further enhanced, and a maintenance cost of the X-ray device can be suppressed.

In such a structure, the same type of resin as the material included in the porous body can be used as the type of resin attached to the crossing portion of the reinforcing fibers. In the X-ray transmission member of the present invention, the resin attached to the crossing portion of the discontinuous reinforcing fibers of the porous body is preferably a thermoplastic resin. Since the thermoplastic resin is used, it is easy to control to attach the resin to the crossing portion of the reinforcing fibers, and a homogeneous structure can be obtained, so that the image quality of the X-ray image can be further improved. In particular, the resin attached to the crossing portion of the discontinuous reinforcing fibers of the porous body is preferably polyolefin-based resins. Since the polyolefin-based resins has a low density, the X-ray permeability is more easily improved. Examples of the polyolefin-based resins include polyethylene resins and polypropylene resins.

In the X-ray transmission member of the present invention, a coefficient of variation (hereinafter, may be referred to as a CV value) in an area weight of the porous body is preferably 5% or less. By setting the CV value within such a range, the homogeneity of the obtained X-ray image is further improved. The CV value can be derived from an average value and a standard deviation by calculating the area weight from the weight of samples obtained by isolating the entire region of the X-ray transmission member irradiated with the X-ray into a lattice shape of 3 cm×3 cm based on a projection area. When the entire region of the X-ray transmission member is isolated into the lattice shape, the region is sequentially cut out from a periphery of the center of the figure of the projection area of the entire region irradiated with the X-ray, and a remaining portion of an end portion of an X-ray transmission portion that cannot be cut out to the above size is excluded from a measurement target. When the surface material (II) is joined to the isolated sample, a method of removing the surface material (II) using a cutter or a polishing machine can be exemplified.

$$\text{Area weight } [\text{g/m}^2] = \text{sample weight } [\text{g}]/\text{projected area } [\text{m}^2]$$

$$\text{CV value of area weight } [\%] = \text{standard deviation of area weight } [\text{g/m}^2]/\text{average value of area weight } [\text{g/m}^2] \times 100$$

Examples of the method for setting the CV value within the above range include a method using a porous body including a resin and voids as the porous body. When the porous body includes the discontinuous reinforcing fibers described above, examples of the method include a method of adjusting a dispersion state of the discontinuous reinforcing fibers, a method of adjusting the ratio (Lf/d) of the average fiber length Lf and the average fiber diameter d, and a method of adjusting flexibility of the reinforcing fibers by appropriately selecting the elastic modulus of the reinforcing fibers.

The X-ray transmission member of the present invention preferably includes the buffer layer (III) between the core material (I) and the surface material (II). With such an aspect, it is possible to suppress a structural change accompanying the deformation or flow of the core material (I) and the surface material (II) which occurs when the X-ray transmission member is molded, and it is easy to control the arithmetic mean roughness Ra of the cross-sectional curve described above. The thickness of the buffer layer (III) is not particularly limited as long as it can suppress the structural change accompanying the deformation or flow of the core material (I) and the surface material (II). From the viewpoint of the X-ray permeability and stiffness, the thickness of the buffer layer (III) is preferably 30 μm or more and 300 μm or less.

The buffer layer (III) can be a resin layer. The resin included in the resin layer may be either a thermosetting resin or a thermoplastic resin, and the thermoplastic resin having a viscosity higher than that of the thermosetting resin is preferable because the thermoplastic resin has a high effect of suppressing deformation when the X-ray transmission member is molded. By using the thermoplastic resin, when a prepreg containing a thermosetting resin as a matrix resin is used as a precursor of the fiber-reinforced resin included in the surface material (II), it is possible to suppress resin flow from the prepreg to the surface of the core material (I), which occurs during molding. By providing the thermoplastic resin layer serving as the buffer layer (III) in advance on the surface of the fiber-reinforced resin included in the surface material (II), the thermoplastic resin layer can also function as an adhesive layer at the time of integration with the core material (I). At this time, it is preferable to select a thermoplastic resin having a softening or melting temperature lower than those of the core material (I) and the surface material (II) as the resin of the thermoplastic resin layer from the viewpoint of obtaining the effect of suppressing deformation at the time of molding the X-ray transmission member. When the thermosetting resin is used for the buffer layer (III), it is preferable to select the thermosetting resin having a faster curability than the resin included in the surface material (II) by heating during molding in order to suppress the flow of the resin to the core material (I). The resin layer used for the buffer layer (III) may include discontinuous reinforcing fibers. As the type of the discontinuous reinforcing fibers, the same type as the reinforcing fibers include in the fiber-reinforced resin can be used.

An aspect in which the buffer layer (III) includes a non-woven fabric-shaped substrate is particularly preferable. In such an aspect, typically, by disposing the non-woven fabric-shaped substrate between the core material (I) and the surface material (II) when the X-ray transmission member is molded, the non-woven fabric-shaped substrate sucks the resin flowing from the surface material (II) and the core material (I) during molding, and as a result, a layer in which the non-woven fabric-shaped substrate is impregnated with the resin remains, whereby the buffer layer is formed. By using the non-woven fabric-shaped substrate in this manner, the boundary between the core material (I) and the surface material (II) can be easily controlled. Among the non-woven fabric-shaped substrates, it is preferable to include a substrate in which discontinuous reinforcing fibers are dispersed in a substantially monofilament state since the effect of sucking the resin flowing from the surface material (II) and/or the core material (I) at the time of molding the X-ray transmission member is further enhanced.

As a method of manufacturing the second aspect of the X-ray transmission member of the present invention, a known method such as press molding, autoclave molding, or hand lay-up molding can be used; however, the press molding is preferable from the viewpoint of shortening a manufacturing cycle time.

The manufacturing method by the press molding preferably includes the following steps (A) to (C), Step (A): a step of providing a fiber-reinforced resin included in the surface material (II) including reinforcing fibers and a matrix resin or a precursor thereof, Step (B): a step of providing a porous body included in the core material (I) or a precursor thereof, Step (C): a step of disposing a substrate obtained in the step (A) on at least one side of a substrate obtained in the step (B), and heating, pressurizing, and integrating the substrates with a pair of double-sided dies.

In the method of manufacturing the second aspect of the X-ray transmission member of the present invention, examples of the method of forming the buffer layer (III) include the method of forming in the step (A) and the method of forming in the step (C). Examples of the method of forming the buffer layer (III) in the step (A) include a method in which the buffer layer (III) is stacked on a precursor of a fiber-reinforced resin and heated and pressurized to form a fiber-reinforced resin in which the surface material (II) and the buffer layer (III) are integrated when the buffer layer (III) contains a resin, and a method in which the buffer layer (III) is bonded to the fiber-reinforced resin of the surface material (II) when the buffer layer (III) does not contain a resin. At this time, the buffer layer (III) is preferably a thermoplastic resin layer. By using the thermoplastic resin layer, the thermoplastic resin layer is softened and melted by heating in the step (C), and can be firmly integrated with the core material (I) or a precursor thereof. Examples of the method of forming the buffer layer (III) in the step (C) include a method in which the buffer layer (III) is disposed between the fiber-reinforced resin of the surface material (II) or a precursor thereof and the core material (I) or a precursor thereof. At this time, the buffer layer (III) is preferably the non-woven fabric-shaped substrate. By using the non-woven fabric-shaped substrate, the resin flowing from the fiber-reinforced resin or the precursor of the fiber-reinforced resin in the step (C) is sucked, and the boundary between the core material (I) and the surface material (II) is easily controlled, so that the buffer layer (III) is formed as a layer in which the non-woven fabric-shaped substrate is impregnated with the resin.

In the X-ray inspection equipment of the present invention, the X-ray transmission member of the present invention is used as a structural member constituting a region through which the X-ray is transmitted. By using the X-ray transmission member of the present invention, the noise characteristic of the image can be improved while achieving a high radiolucency rate, so that the image quality of the obtained X image is improved. Specific examples of the X-ray inspection equipment are as described above.

EXAMPLES

Hereinafter, examples will be shown to describe the present invention more specifically. However, the scope of the present invention is not limited at all to these Examples Materials <Prepreg>
Prepreg 1

"Torayca (registered trademark) prepreg" F6347B-05K manufactured by Toray Industries, Inc. was used as a precursor of a fiber-reinforced resin used as a surface material.

Prepreg 2

"Torayca (registered trademark) prepreg" P3252S-10 manufactured by Toray Industries, Inc. was used as a precursor of a fiber-reinforced resin used as a surface material.

<Polypropylene (PP) Film>
PP Film 1

A polypropylene film having an area weight of 100 g/m$^2$ was prepared using a master batch obtained by mixing 90% by mass of unmodified polypropylene ("Prime Polypro" (registered trademark) J106MG (manufactured by Prime Polymer Co., Ltd.)) and 10% by mass of acid-modified polypropylene ("ADMER" (registered trademark) QE800 (manufactured by Mitsui Chemicals, Inc.))

PP Film 2

A polypropylene film having an area weight of 30 g/m$^2$ was prepared using a master batch obtained by mixing 30% by mass of acid-modified polypropylene (UMEX1010 manufactured by Sanyo Chemical Industries, Ltd.) and 70% by mass of polypropylene (J229E manufactured by Mitsui Chemicals, Inc.).

<Carbon Fiber Web>

A copolymer mainly composed of polyacrylonitrile was subjected to spun processing, a calcination treatment, and a surface oxidation treatment, and carbon fibers (fiber diameter: 7 µm) including continuous carbon fibers with a total number of monofilaments of 24,000 were cut into a length of 6 mm with a cartridge cutter to obtain chopped carbon fibers. Thereafter, a dispersion medium including water and a surfactant was prepared and introduced into a paper-making device. Thereafter, chopped carbon fibers having a mass adjusted so as to have a desired area weight were put into the dispersion medium and stirred to obtain a slurry in which the carbon fibers were dispersed. Next, the slurry was sucked from a water storage tank of the paper-making device, dehydrated, and then dried in a hot air dryer at 150° C. for 2 hours to obtain a carbon fiber web having an area weight of 100 g/m$^2$.

<Carbon Fiber Mat>

A copolymer mainly composed of polyacrylonitrile was subjected to spun processing, a calcination treatment, and a surface oxidation treatment, and carbon fibers (fiber diameter: 7 µm) including continuous carbon fibers with a total number of monofilaments of 24,000 were cut into a length of 10 mm with a cartridge cutter to obtain chopped carbon fibers. The obtained chopped carbon fibers were caused to fall freely from a height of 80 cm to obtain a carbon fiber mat having an area weight of 100 g/m$^2$ in which the chopped carbon fibers were randomly dispersed.

[Measurement Methods]

<Arithmetic Mean Roughness Ra of Cross-Sectional Curve>

Figure 2:
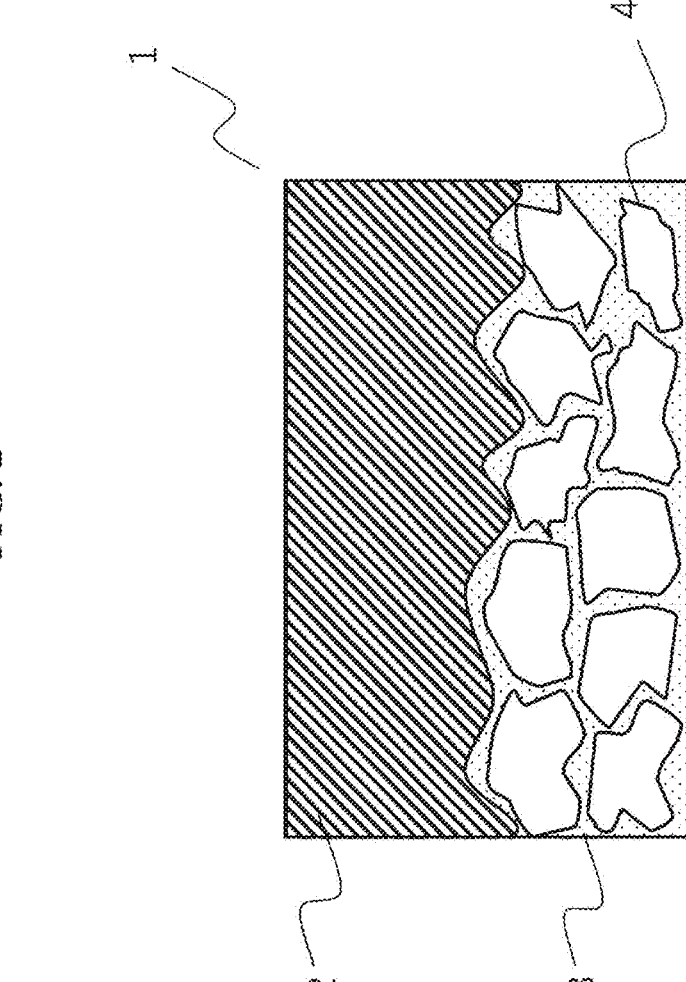
FIG. 2 is a schematic view illustrating an example of a cross section of the X-ray transmission member of the present invention.

The X-ray transmission member produced in each of Examples and Comparative Examples was cut with a diamond cutter in a direction perpendicular to the surface, that is, in a thickness direction, and the cross section was embedded in resin and polished, and then photographed at a magnification of 200 times using an optical microscope. A cross-sectional image was obtained by connecting the photographed images such that a region of 2 mm or more in the plane direction was an image range. FIG. 2 is a schematic view illustrating an example of a cross section.

A method of obtaining the cross-sectional curve will be described using the schematic diagram of FIG. 3 as an example. In an arbitrary observation range of 2 mm width in the obtained cross-sectional image, a cross-sectional curve was acquired as follows. Vertical lines 8 were drawn at an interval of 5 µm from the surface material (II) 2 toward the core material (I) 3 with an outer surface 7 on the surface material (II) 2 side of the rectangular cross-sectional image 5 as a reference line. A point at which the vertical line 8 drawn from the reference line intersected the void 4 of the porous body included in the core material (I) for the first time was plotted, and a line connecting the plotted points was defined as the cross-sectional curve 9. From the obtained cross-sectional curve, the arithmetic mean roughness Ra of the cross-sectional curve was determined in accordance with JIS B0601 (2001) with a reference length of 2 mm.

<Radiolucency Rate>

The evaluation was performed with a narrow beam system in accordance with IEC61331-1 and a radiation quality RQA-M2 in accordance with IEC62220-1. As the radiolucency rate, a ratio of a value detected during transmission through the X-ray transmission member produced in each of Examples and Comparative Examples was evaluated with a value detected in a state where the sample was not disposed as 100.

<Evaluation of Image Quality Properties of X-Ray Image>

X-ray images of the X-ray transmission members produced in Examples and Comparative Examples were taken with the radiation quality RQA-M2 in accordance with IEC62220-1. The obtained X-ray image was analyzed to obtain an NPS curve, and the value of NPS at a spatial frequency of 1 Cycle/mm was evaluated as image quality properties. The lower value of NPS means that noise relating to the image quality is reduced, and the image quality properties are excellent.

<Density of Porous Body>

The density of the porous body prepared in each of Examples and Comparative Examples was acquired in accordance with JIS K7222 (2005). When the surface material (II) was joined and it was difficult to obtain the core material (I) alone, the porous body was extracted by removing the surface material (II) using an NC processing machine.

<Evaluation of Flexural Properties of Porous Body>

The bending modulus and the bending strength of the porous body prepared in each of Examples and Comparative Examples were acquired in accordance with JIS K7017 (1999). As the size of a test piece, Class I of the above standard was adopted. When the surface material (II) was joined and it was difficult to obtain the core material (I) alone, the porous body was extracted by removing the surface material (II) using an NC processing machine.

<Sum Ts of Thickness of Surface Material (II) of X-Ray Transmission Member and Sum Tc of Thickness of Core Material (I)>

The X-ray transmission member produced in each of Examples and Comparative Examples was cut with a diamond cutter in a direction perpendicular to the surface, that is, in a thickness direction, and the cross section was embedded in resin and polished, and then photographed at a magnification of 200 times using an optical microscope. A cross-sectional image was obtained by connecting the photographed images such that the entire region of the thickness was included and a region of 2 mm or more in the plane direction was an image range.

In an arbitrary observation range of 2 mm width in the obtained cross-sectional image, a vertical line was drawn from the surface material (II) toward the core material (I) with the outer surface on the surface material (II) side as a reference line, and the vertical line length when the vertical line drawn from the reference line intersected the void of the porous body included in the core material (I) for the first time was recorded. The measurement was performed 10 times at an arbitrary position, and the average value thereof was defined as ts. When there were a plurality of the surface materials (II), the average value of the vertical line lengths of each surface material (II) was obtained, and the average value thereof was defined as ts.

The sum tc of the thicknesses of the core material (I) was obtained by subtracting ts obtained by the above method from the thickness of the X-ray transmission member.

Example 1

Four PP films 1 and two carbon fiber webs were stacked in the order of PP film 1/carbon fiber web/PP film 1/PP film 1/carbon fiber web/PP film 1. The resulting laminate was impregnated with a polypropylene resin by heating at a temperature of 180° C. and pressurizing at a pressure of 3 MPa using a hydraulic press machine, and then the pressure was released to sandwich a 2.5 mm spacer between tool plates, and the laminate was cooled at 100° C. to obtain a core material A. A prepreg 1 was stacked on one surface of the core material A, and heated and pressurized at a surface pressure of 0.5 MPa at 150° C. for 30 minutes using a hydraulic press machine to obtain an X-ray transmission member.

Example 2

The PP film 2 was stacked on one surface of the prepreg 1, and heated and pressurized at a surface pressure of 0.5 MPa at 150° C. for 30 minutes using a hydraulic press machine to obtain a fiber-reinforced resin B having a layer of polypropylene to be the buffer layer (III) on one surface. As the core material, the core material A obtained by the method described in Example 1 was provided. The fiber-reinforced resin B was stacked on one surface of the core material A so that the polypropylene layer of the fiber-reinforced resin B was on the core material A side, and the laminate was heated and pressurized at a surface pressure of 1.0 MPa at 160° C. for 10 minutes using a hydraulic press machine, and then cooled to 50° C. while maintaining the surface pressure to obtain an X-ray transmission member.

Example 3

The fiber-reinforced resin B obtained by the method described in Example 2 was provided as the surface material (II). An acrylic foam ("Formac (registered trademark)" S #1000, manufactured by Sekisui Chemical Co., Ltd.) was cut out to obtain a core material C having a thickness of 2.5 mm. The fiber-reinforced resin B was stacked on one surface of the core material C so that the polypropylene layer of the fiber-reinforced resin B was on the core material C side, and the laminate was heated and pressurized at a surface pressure of 1.0 MPa at 160° C. for 10 minutes using a hydraulic press machine, and then cooled to 50° C. while maintaining the surface pressure to obtain an X-ray transmission member.

Comparative Example 1

The prepreg 1 was stacked on one surface of the core material A, and the laminate was heated and pressurized at a surface pressure of 3.0 MPa at 150° C. for 30 minutes using a hydraulic press machine to obtain an X-ray transmission member.

Comparative Example 2

The prepreg 1 was stacked on one surface of the core material C, and the laminate was heated and pressurized at a surface pressure of 3.0 MPa at 150° C. for 30 minutes using a hydraulic press machine to obtain an X-ray transmission member.

Example 4

Two PP films 1 and one carbon fiber web were stacked in the order of PP film 1/carbon fiber web/PP film 1. The resulting laminate was impregnated with a polypropylene resin by heating at a temperature of 180° C. and pressurizing at a pressure of 3 MPa using a hydraulic press machine, and then the pressure was released to sandwich a 1.0 mm spacer between tool plates, and the laminate was cooled at 100° C. to obtain a core material D. The prepreg 2 was stacked on both surfaces of the core material D so as to have a laminate structure of [0/90/core material D/90/0], and the laminate was heated and pressurized at a surface pressure of 0.5 MPa at 150° C. for 30 minutes using a hydraulic press machine to obtain an X-ray transmission member. Regarding the notation of the laminate structure, the layer in which the fiber direction of the prepreg 2 coincides with a predetermined reference axis is [0], and the layer in which the fiber orthogonal direction coincides with the predetermined reference axis is.

Example 5

Two PP films 1 and one carbon fiber web were stacked in the order of PP film 1/carbon fiber web/PP film 1. The resulting laminate was impregnated with a polypropylene resin by heating at a temperature of 180° C. and pressurizing at a pressure of 3 MPa using a hydraulic press machine, and then pressurized at a temperature of 100° C. and a pressure of 3 MPa to obtain a sheet-shaped core material precursor. The prepreg 2 was stacked on both surfaces of the core material precursor so as to have a laminate structure of [0/90/core material precursor/90/0], and the laminate was heated and pressurized at a surface pressure of 0.5 MPa at 150° C. for 30 minutes using a hydraulic press machine to obtain a preform. The obtained preform was preheated in an oven at 180° C. for 10 minutes to expand the core material precursor, and thus to form a porous body, and then the laminate was sandwiched between tool plates provided with a 1.4 mm spacer and cooled at 100° C. to obtain an X-ray transmission member.

Example 6

The PP film 2 was stacked on one surface of a laminate in which the prepreg 2 was stacked to have a laminate structure of [0/90], and the laminate was heated and pressurized at a surface pressure of 0.5 MPa at 150° C. for 30 minutes using a hydraulic press machine to prepare two sets of fiber-reinforced resins E having a layer of polypropylene to be the buffer layer (III) on one surface. As the core material (I), the core material D obtained by the method described in Example 4 was provided. The fiber-reinforced resins E were stacked on both surfaces of the core material D so that the polypropylene layer of the fiber-reinforced resin E was on the core material D side and a fiber orientation of the surface was coincident, and the laminate was heated and pressurized at a surface pressure of 1.0 MPa at 160° C. for 10 minutes using a hydraulic press machine, and then cooled to 50° C. while maintaining the surface pressure to obtain an X-ray transmission member.

Example 7

An X-ray transmission member was obtained in the same manner as in Example 4 except that a carbon fiber mat was used instead of the carbon fiber web.

Example 8

The fiber-reinforced resin E obtained by the method described in Example 6 was provided as the surface material (II). A polymethacrylamide foam ("ROHACELL (registered trademark)" 110 IG-F, manufactured by Daicel-Evonik Ltd.) was cut out to obtain a core material F having a thickness of 1.0 mm. The fiber-reinforced resins E were stacked on both surfaces of the core material F so that the polypropylene layer of the fiber-reinforced resin E was on the core material F side and a fiber orientation of the surface was coincident, and the laminate was heated and pressurized at a surface pressure of 1.0 MPa at 160° C. for 10 minutes using a hydraulic press machine, and then cooled to 50° C. while maintaining the surface pressure to obtain an X-ray transmission member.

Example 9

The fiber-reinforced resin E obtained by the method described in Example 6 was provided as the surface material (II). A polypropylene foam ("EFCELL (registered trademark)" RC 2010, manufactured by Furukawa Electric Co., Ltd.) was cut out to obtain a core material G having a thickness of 1.0 mm. The fiber-reinforced resins E were stacked on both surfaces of the core material G so that the polypropylene layer of the fiber-reinforced resin E was on the core material G side and a fiber orientation of the surface was coincident, and the laminate was heated and pressurized at a surface pressure of 1.0 MPa at 160° C. for 10 minutes using a hydraulic press machine, and then cooled to 50° C. while maintaining the surface pressure to obtain an X-ray transmission member.

The characteristics of the X-ray transmission members obtained in the above Examples and Comparative Examples are summarized in Tables 1 and 2.

TABLE 1

| | | Example 1 | Example 2 | Example 3 | Comparative Example 1 | Comparative Example 2 |
|---|---|---|---|---|---|---|
| Arithmetic mean roughness Ra of cross-sectional curve (μm) | | 21 | 9 | 17 | 54 | 67 |
| Radiolucency rate (%) | | 95 | 95 | 95 | 95 | 96 |
| Image quality properties of X-ray image: NPS ($\times 10^{-6}$ mm$^2$) | | 1.4 | 1.2 | 1.3 | 1.6 | 1.7 |
| Porous body | Density (g/cm$^3$) | 0.24 | 0.24 | 0.11 | 0.25 | 0.11 |
| | Bending modulus (GPa) | 2.0 | 2.0 | 0.1 | 2.0 | 0.1 |
| | Bending strength (MPa) | 22 | 22 | 3 | 22 | 3 |
| X-ray transmission member | ts/tc | 0.08 | 0.10 | 0.10 | 0.08 | 0.08 |

TABLE 2

| | | Example 4 | Example 5 | Example 6 | Example 7 | Example 8 | Example 9 |
|---|---|---|---|---|---|---|---|
| Arithmetic mean roughness Ra of cross-sectional curve (μm) | | 19 | 11 | 8 | 39 | 26 | 14 |
| Radiolucency rate (%) | | 96 | 95 | 95 | 95 | 96 | 95 |
| Image quality properties of X-ray image: NPS ($\times 10^{-6}$ mm$^2$) | | 1.4 | 1.2 | 1.2 | 1.5 | 1.5 | 1.2 |
| Porous body | Density (g/cm$^3$) | 0.30 | 0.30 | 0.30 | 0.30 | 0.11 | 0.45 |
| | Bending modulus (GPa) | 2.6 | 2.6 | 2.6 | 2.1 | 0.2 | 0.4 |
| | Bending strength (MPa) | 31 | 31 | 31 | 22 | 5 | 13 |
| X-ray transmission member | ts/tc | 0.40 | 0.40 | 0.46 | 0.40 | 0.46 | 0.46 |

DESCRIPTION OF REFERENCE SIGNS

1: X-ray transmission member
2: Surface material (II)
3: Core material (I)
4: Void
5: Cross-sectional image
6: Boundary
7: Outer surface
8: Vertical line
9: Cross-sectional curve

The invention claimed is:

1. An X-ray transmission member used in an X-ray inspection equipment, the X-ray transmission member comprising:
   a porous body,
   a core material (I), and
   a surface material (II) including a fiber-reinforced resin on at least one side of the core material (I),
   wherein the core material (I) is the porous body, and
   wherein a surface of the porous body has an arithmetic mean roughness Ra defined in JIS B0601 (2001) of 100 µm or less.

2. An X-ray transmission member used in an X-ray inspection equipment, the X-ray transmission member comprising:
   a core material (I); and
   a surface material (II) disposed on at least one side of the core material (I),
   wherein the core material (I) is a porous body, the surface material (II) includes a fiber-reinforced resin, and an arithmetic mean roughness Ra defined by JIS B0601 (2001) of a cross-sectional curve formed by a joining surface on the surface material (II) side of the core material (I) is 50 µm or less.

3. The X-ray transmission member according to claim 2, wherein the arithmetic mean roughness Ra of the cross-sectional curve is 20 µm or less.

4. The X-ray transmission member according to claim 1, wherein the porous body has a density of 0.05 g/cm$^3$ or more and 0.50 g/cm$^3$ or less.

5. The X-ray transmission member according to claim 1, wherein the porous body has a bending modulus defined by JIS K7017 (1999) of 2.0 GPa or more and 7.5 GPa or less.

6. The X-ray transmission member according to claim 1, wherein the porous body has a bending strength of 15 MPa or more and 150 MPa or less.

7. The X-ray transmission member according to claim 1, wherein the porous body includes discontinuous reinforcing fibers.

8. The X-ray transmission member according to claim 7, wherein the porous body has a three-dimensional network structure in which a resin is attached to a crossing portion of the discontinuous reinforcing fibers.

9. The X-ray transmission member according to claim 8, wherein the resin attached to the crossing portion of the discontinuous reinforcing fibers of the porous body is a thermoplastic resin.

10. The X-ray transmission member according to claim 7, wherein an average fiber length of the discontinuous reinforcing fibers included in the porous body is 1.5 mm or more and 15 mm or less.

11. The X-ray transmission member according to claim 1, wherein a coefficient of variation in an area weight of the porous body is 5% or less.

12. The X-ray transmission member according to claim 1, wherein a ratio ts/tc of a sum ts of the thicknesses of the surface material (II) and a sum tc of the thicknesses of the core material (I) is 0.10 or more and 0.55 or less.

13. The X-ray transmission member according to claim 1, wherein the surface material (II) includes continuous reinforcing fibers.

14. The X-ray transmission member according to claim 1, further comprising carbon fibers as the reinforcing fibers of the porous body of the core material (I) and/or the surface material (II).

15. The X-ray transmission member according to claim 1, wherein the matrix resin of the fiber-reinforced resin of the surface material (II) is a thermosetting resin.

16. The X-ray transmission member according to claim 1, further comprising a buffer layer (III) between the core material (I) and the surface material (II).

17. The X-ray transmission member according to claim 1, wherein the X-ray inspection equipment is a medical device that acquires an X-ray image of a human body.

18. An X-ray inspection equipment comprising the X-ray transmission member according to claim 1 used as a structural member constituting a region through which an X-ray is transmitted.

* * * * *